Oct. 21, 1952  A. T. JONES ET AL  2,614,814
COAL DRILL BIT
Filed Dec. 23, 1948

Inventors:
Arden T. Jones.
Clayton A. Newport.
by
Charles F. Osgood,
Attorney.

Patented Oct. 21, 1952

2,614,814

UNITED STATES PATENT OFFICE 2,614,814

COAL DRILL BIT

Arden T. Jones, New Philadelphia, Ohio, and Clayton A. Newport, Ferndale, Mich., assignors to Joy Manufacturing Company, Pittsburgh, Pa., a corporation of Pennsylvania Application December 23, 1948, Serial No. 66,932

7 Claims. (Cl. 255—69)

This invention relates to drill bits, and more particularly to rotary auger bits for drilling blast holes in minerals such as coal.

In rotary coal drill bits, it is common practice to attach a drill bit to an auger steel having spiral conveyor flutes or vanes for conveying the cuttings or chips from the drill hole, and to provide the cutting teeth or cutter arms of the bit with hard metal inserts, to provide wear resisting cutting edges, thereby to increase the wearing qualities of the bit. The present invention contemplates improvements over known types of drill bits in that the cutting teeth or cutter arms of the bit are formed and arranged in an improved manner so that an improved drilling action and a smooth flow of cuttings or chips to the spiral conveyor flutes of the auger steel, are attained. The cutting teeth or cutter arms of the bit of the present invention have hard metal inserts set in the cutting faces, and the teeth or arms are so formed that an undesirable churning action as the cuttings or chips move toward the steel flutes is completely eliminated. In accordance with the present invention, the cutting faces of the cutting teeth or arms lie in relatively oppositely inclined planes which are inclined slightly with respect to the axial center of the bit and which intersect the axial center line of the bit, when viewed both laterally and longitudinally, so that the drilling of a hole is more effectively accomplished.

An object of the present invention is to provide an improved rotary drill bit adapted for detachable connection to a rotary conveyor screw type, auger steel, for drilling minerals such as coal and for feeding cuttings or chips created during the hole forming operation toward the spiral flutes of the auger steel which serve to convey the cuttings from the hole formed by the bit. Another object is to provide an improved drill bit having a novel formation and arrangement of the cutting faces of the bit whereby an improved hole drilling action is attained. A further object is to provide an improved rotary drill bit which is streamlined to promote smooth flow of cuttings or chips in a direct and unobstructed path toward the auger flutes, thereby eliminating an undesirable churning action of the cuttings and reducing the possibility of clogging. Still another object is to provide an improved drill bit having cutting teeth or cutter arms projecting forwardly from the bit body and provided with forward faces which are relatively oppositely inclined and inclined slightly with respect to the axial center line of the bit to provide a forward rake, and which, when viewed from the front end and side of the bit, intersect the axial center line. A still further object is to provide an improved cutter bit having an improved body shape. These and other objects and advantages of the invention will, however, hereinafter more fully appear.

In the accompanying drawing there is shown for purposes of illustration one form which the invention may assume in practice.

Figure 1:
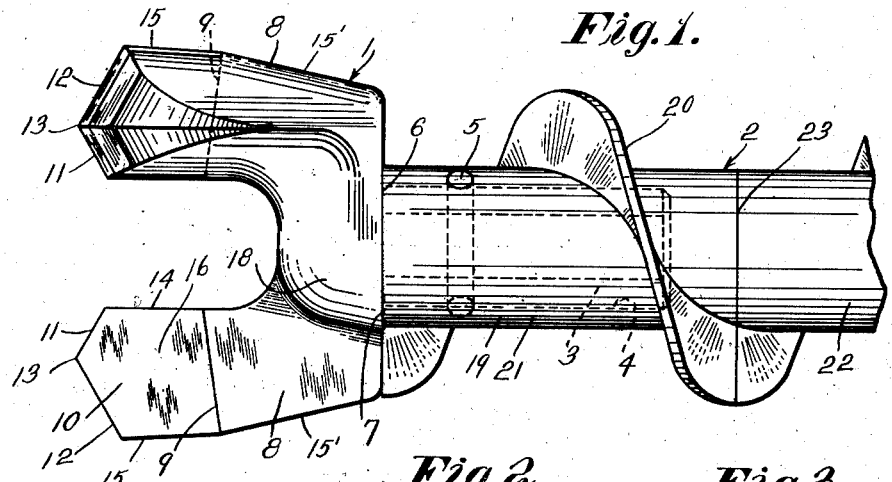
Fig. 1 is a side view of a rotary drill bit constructed in accordance with an illustrative embodiment of the invention, and shown attached to an auger drill steel.

In this illustrative embodiment of the invention, as shown in the drawing, the improved drill bit generally designated 1 is shown attached to a conventional auger drill steel generally designated 2. While the means for attaching the drill bit to the steel may assume various forms, the attaching means shown herein comprises a hexagonal shank 3 fitted in a correspondingly shaped socket 4 in the steel and a transverse pin 5 received in alined holes in the bit shank and in the steel body locks the bit firmly in position on the steel with a rear plane surface 6 of the bit body abutting the front end surface 7 of the drill steel, in the manner shown in Fig. 1.

Figure 2:
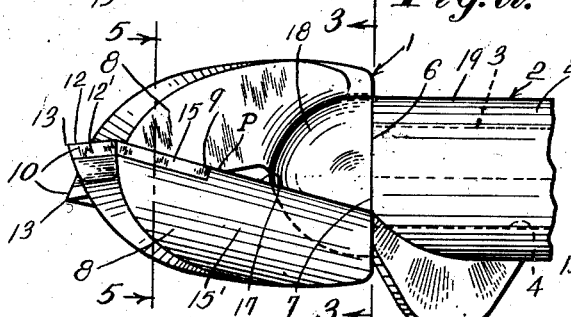
Fig. 2 is a side view of the drill bit shown in Fig. 1, with the bit turned on its axis through an angle of 90°.
Figure 3:
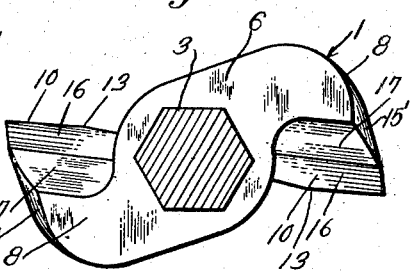
Fig. 3 is a cross sectional view taken on line 3—3 of Fig. 2.
Figures 4, 5:
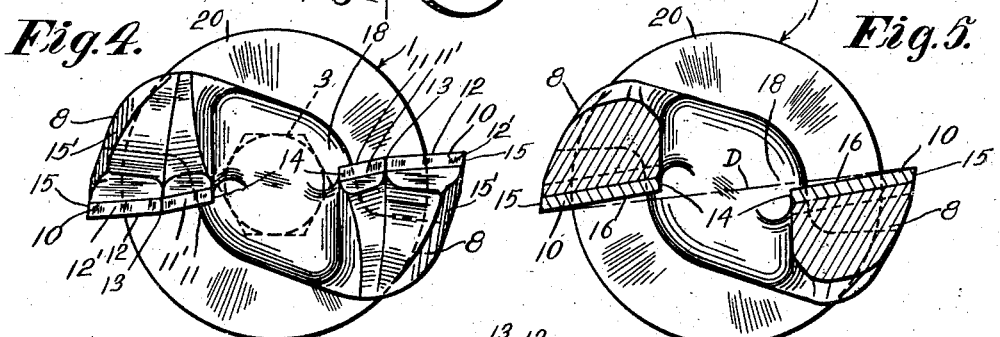
Fig. 4 is a front end view of the drill bit.
Fig. 5 is a cross sectional view taken on line 5—5 of Fig. 2.
Figure 6:
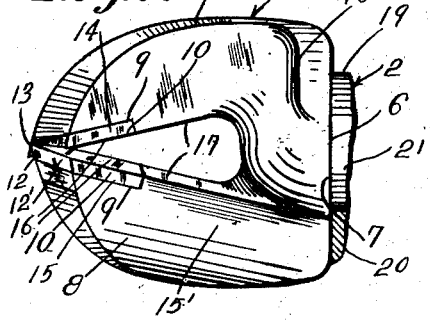
Fig. 6 is a side view of the drill bit with the bit turned slightly on its axis from the position shown in Fig. 2.
Figure 7:
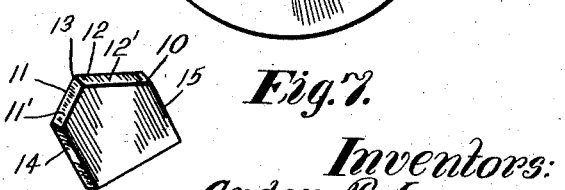
Fig. 7 is a perspective view of one of the hard metal inserts.

The improved drill bit has cutting teeth or cutter arms 8, 8 projecting forwardly from its body, and these arms are rectangularly recessed or cut away at 9 at their forward sides for receiving hard metal inserts 10 desirably composed of tungsten carbide and which are brazed, silver soldered or otherwise secured to the arms. While but two teeth or arms are shown, evidently three or more may be employed under certain conditions. The front end surfaces 11 and 12 of the inserts and arms are formed, as by grinding, to provide relatively inclined front edges 11' and 12' which intersect to provide cutting points 13. The inserts have parallel inner and outer side edges 14 and 15 extending longitudinally substantially in parallelism with the axial center line of the bit. The bit teeth or arms recede rearwardly and inwardly at 15' from the outer edges 15 to provide side clearance to facilitate grinding of the outer edges of the inserts during sharpening of the bit. The inserts have plane front cutting faces 16 which lie flush with front faces 17 of the arms, and these front faces extend rearwardly and inwardly toward the bit center and terminate along the rear face 6 of the bit body in such relation to the spiral conveyor flutes of the auger steel that the cuttings or chips flow smoothly from the cutting portions of the bit arms rearwardly toward the spiral flutes, thereby eliminating a churning action and reducing the possibility of clogging of the debris. The front cutting face 16 of the insert and the front face 17 of each arm lie in substantially a common plane (designated P in Fig. 2) which is inclined slightly with respect to the axial center line of the bit to provide a forward rake and such plane of one cutter arm is inclined oppositely and symmetrically with respect to the similar plane of the other arm, and such relatively inclined planes intersect the axial center line of the bit in such manner that an extremely effective hole drilling action is attained. Such relatively inclined planes have their point of intersection with the axial center line of the bit spaced a substantial distance rearwardly of the foremost surfaces of the bit. The plane faces referred to are so disposed with respect to each other and the body of the bit that their intersections with a plan perpendicular to the bit axis make like angles with a diametric line (designated D in Fig. 5) connecting the outer ends of such intersections, and such angles are disposed in each case, as regards the direction of bit rotation, to the rear of such diametric line. The bit body has a central portion which is forwardly generally rounded at 18 and at the rear face this central portion is generally circular to correspond to the generally cylindrical central portion 19 of the auger steel to which the spiral flutes or vanes 20 of the steel are secured. Thus, by the provision of this rounded central body portion, smooth flow of cuttings past the bit body is further promoted. Also, evidently, the shape and arrangement of the cutting faces and cutting arms may vary slightly in bits of different sizes. The auger steel may be formed of alined sections 21 and 22 suitably joined together at 23, or may be composed of one integral piece, as desired.

The rear end of the auger steel may be formed in a conventional manner, as by the provision of a shank, for reception in the usual chuck of a conventional rotary drilling tool, and the auger steel or bit may be rapidly rotated and fed toward the work during the drilling operation. As the hole is being drilled, the cutting edges and faces of the teeth cut away the material being drilled, and the cuttings or chips, due to the novel shape of the teeth or arms, are directed rearwardly of the front faces in an unobstructed path toward the spiral flutes of the auger steel, and such unimpeded rearward flow of the cuttings eliminates undesirable churning of the cuttings and thus reduces the possibility of clogging. The novel arrangement of the cutter arms and the hard metal inserts thereon results in greater drilling efficiency in minerals such as coal. The novel arrangement of the inclined cutting faces of the inserts and the cutter arms with respect to the axial center line of the bit results in an improved drilling action, and this, together with the smooth rearward flow of the cuttings toward the conveyor screw, results in substantially greater overall drilling efficiency. By locating the hard metal inserts and forming the supporting portions therefor in the manner disclosed, the bit may be readily resharpened, as by grinding, when the bit becomes dull through use. The drill bit is simple and rugged in design well adapted to withstand the severe demands of service. Other uses and advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What we claim as new and desire to secure by Letters Patent is:

1. A rotary drill bit adapted for attachment to a drill steel comprising a bit body having forwardly projecting cutter arms of symmetrical formation and spaced equidistantly from the bit center, said cutter arms being provided with plane front faces lying in planes which are inclined in relatively opposite directions slightly with respect to the axial center line of the bit to provide a forward rake, and which planes intersect the axial center line of the bit at a point spaced a substantial distance rearwardly of the foremost surfaces of the bit, and said plane faces so disposed with respect to each other and the body of the bit that a straight line connecting the outer ends of their intersections with a plane perpendicular to the bit axis extends diametrically with respect to the bit and that such intersections make like angles to such diametric line and said angles are disposed in each case, as regards the direction of bit rotation, to the rear of said diametric line.

2. A rotary drill bit adapted for attachment to an auger steel having flutes and comprising a bit body having forwardly projecting cutter arms of symmetrical formation and spaced equidistantly from the bit center, said cutter arms being provided with plane front faces lying in relatively inclined planes which are inclined in opposite directions slightly with respect to the axial center line of the bit to provide a forward rake, and which planes intersect the axial center line of the bit at a point spaced a substantial distance rearwardly of the foremost surfaces of the bit, said plane faces so disposed with respect to each other and the body of the bit that their intersections with a plane perpendicular to the bit axis make like angles with a diametric line connecting the outer ends of such intersections, said angles disposed in each case, as regards the direction of bit rotation, to the rear of said diametric line, said relatively inclined faces extending rearwardly and inwardly into registry with the auger flutes to promote smooth flow of the cuttings toward the auger flutes.

3. A rotary drill bit adapted for attachment to an auger drill steel having spiral conveyor flights and comprising a bit body having forwardly projecting cutter arms of symmetrical formation and spaced equidistantly from the bit center, said arms being provided with plane front faces lying in planes which are relatively inclined in opposite directions slightly with respect to the axial center line of the bit to provide a forward rake, and which planes intersect the axial center line of the bit at a point spaced a substantial distance rearwardly of the foremost surfaces of the bit, and said plane faces so disposed with respect to each other and the body of the bit that their intersections with a plane perpendicular to the bit axis make like angles with a diametric line connecting the outer ends of such intersections, said angles disposed in each case, as regards the direction of bit rotation, to the rear of said diametric line, said relatively inclined faces extending rearwardly and inwardly into registry with the spiral conveyor flutes of the auger steel to promote smooth flow of the cuttings toward the conveyor flutes, and said body having a central portion provided with a generally rounded front surface which coacts with the arm faces in the promotion of smooth flow of cuttings toward the spiral conveyor flutes of the auger steel.

4. A rotary drill bit adapted for attachment to an auger drill steel which has a generally cylindrical central portion to which spiral conveyor flutes are secured, said bit having a body provided with a plane transverse rear surface which abuts the front end surface of the steel body, said bit body having a circular rear portion fitting against the cylindrical portion of the drill steel and having its front surface generally rounded, and cutter arms of symmetrical formation projecting forwardly from the bit body and spaced equidistantly from the bit center, said cutter arms having front faces which extend rearwardly and inwardly to join smoothly with the front ends of the spiral auger flutes, said front faces lying in planes which intersect the axial center line of the bit and are so disposed with respect to each other and the body of the bit that their intersections with a plane perpendicular to the bit axis make like angles with a diametric line connecting the outer ends of such intersections, said angles disposed in each case, as regards the direction of bit rotation, to the rear of said diametric line.

5. A rotary drill bit adapted for attachment to an auger drill steel which has a generally cylindrical central portion to which spiral conveyor flutes are secured, said bit having a body provided with a plane transverse rear surface which abuts the front end surface of the cylindrical portion of the drill steel, said bit body having a circular rear portion fitting against the cylindrical steel body and having its front surface generally rounded, and cutter arms of symmetrical formation projecting forwardly from the bit body and spaced equidistantly from the bit center, said cutter arms having front faces which extend rearwardly and inwardly to join smoothly with the front ends of the spiral auger flutes, and said arm faces lying in planes which are inclined in relatively opposite directions slightly with respect to the axial center line of the bit to provide a forward rake and which intersect the axial center line of the bit, said planes intersecting the axial center line of the bit a substantial distance rearwardly of the foremost surfaces of the bit, said front faces so disposed with respect to each other and the body of the bit that their intersections with a plane perpendicular to the bit axis make like angles with a diametric line connecting the outer ends of such intersections, said angles disposed in each case, as regard the direction of bit rotation, to the rear of said diametric line.

6. A rotary drill bit adapted for attachment to a drill steel and comprising a bit body having forwardly projecting cutter arms of symmetrical formation spaced equidistantly from the bit center and provided with plane front faces lying in planes which are relatively inclined in opposite directions slightly with respect to the axial center line of the bit to provide a forward rake and which planes intersect the axial center line of the bit at a common point spaced rearwardly from the foremost surfaces of the bit, said cutter arms having terminal cutting portions at the forward portions of said plane fron faces, and said plane faces so disposed with respect to each other and the body of the bit that their intersections with a plane perpendicular to the bit axis make like angles with a diametric line connecting the outer ends of such intersections, said angles disposed in each case, as regards the direction of bit rotation, to the rear of said diametric line.

7. A rotary drill bit adapted for attachment to a drill steel and comprising a bit body having forwardly projecting cutter arms provided with symmetrical cutting portions spaced equidistantly from the bit center, said cutter arms provided with plane front faces lying in planes which are relatively inclined in opposite directions slightly with respect to the axial center line of the bit to provide a forward rake and which intersect the axial center line of the bit at a common point spaced rearwardly from the front face of the bit, said plane faces so disposed with respect to each other and the body of the bit that their intersections with a plane perpendicular to the bit axis make like angles with a diametric line connecting the outer ends of such intersections, said angles disposed in each case, as regards the direction of bit rotation, to the rear of said diametric line.

ARDEN T. JONES.
CLAYTON A. NEWPORT.

REFERENCES CITED

The following references are of record in the file of this patent:

UNITED STATES PATENTS

| Number | Name | Date |
|---|---|---|
| 1,316,435 | Esa | Sept. 16, 1919 |
| 2,097,040 | Pivoto | Oct. 26, 1937 |
| 2,339,104 | Phipps | Jan. 11, 1944 |
| 2,372,612 | Stogsdill | Mar. 27, 1945 |
| 2,380,112 | Kinnear | July 10, 1945 |

FOREIGN PATENTS

| Number | Country | Date |
|---|---|---|
| 394,890 | Great Britain | July 6, 1933 |
| 500,147 | Great Britain | Feb. 3, 1939 |
| 528,593 | Great Britain | Nov. 1, 1940 |
| 599,451 | Great Britain | Mar. 12, 1948 |
| 600,676 | Germany | July 28, 1934 |